Sept. 8, 1970   G. JANKOWITZ   3,527,945
MOUNTING STRUCTURE FOR A LIQUID CRYSTAL
THERMAL IMAGING DEVICE
Filed Sept. 24, 1968

INVENTOR.
GERALD JANKOWITZ

BY

ATTORNEY

United States Patent Office 3,527,945
Patented Sept. 8, 1970

3,527,945
MOUNTING STRUCTURE FOR A LIQUID
CRYSTAL THERMAL IMAGING DEVICE
Gerald Jankowitz, Hillsdale, N.J., assignor to Barnes
Engineering Company, Stamford, Conn., a corporation
of Delaware
Filed Sept. 24, 1968, Ser. No. 762,007
Int. Cl. G01j 5/06
U.S. Cl. 250—83                      2 Claims

ABSTRACT OF THE DISCLOSURE

A thermal image system is provided utilizing temperature sensitive chemicals referred to as "liquid crystal detectors" which detect thermal patterns in a field of view imaged thereon, and convert these thermal patterns to a visible image. The liquid crystal detector is mounted on a thin blackened membrane and supported through ribs or spokes of the membrane material in an evacuated housing. By mounting the membrane via ribs or spokes to its support, temperature non-uniformities across the membrane are alleviated. Additionally, thermal radiation is applied to the liquid crystal detector via a reflective cone to neutralize geometrical steradiancy variations across the membrane.

BACKGROUND OF THE INVENTION

This invention relates to a thermal imaging system in which the thermal image is converted to a visual image by a single transducer means in the form of temperature sensitive chemicals referred to hereinafter as "liquid crystal detectors."

The type of system in which the present invention is utilized is shown and described in Pat. No. 3,114,836 entitled "Thermal Imaging Devices Utilizing a Cholesteric Liquid Crystalline Phase Material" issued. Dec. 17, 1963. In such a system a liquid crystalline material is supported by an extremely thin blackened membrane and exposed to the infrared radiation of a field of view. The temperature sensitive liquid crystal when illuminated by visible radiation provides a visible image of the thermal radiation from the field of view. Thermal imaging, which is referred to here as providing a thermal image for temperatures in and around ambient, is difficult because of the tight temperature control over the liquid crystal which is required. In other words, the liquid crystal detector must distinguish the thermal image from its environment or background which has approximately the same temperature. Accordingly, the use of liquid crystal materials for thermal imaging requires extremely tight control of the absolute temperature of the substrate or membrane carrying the material and the maintaining of extremely good temperature uniformity across the substrate or membrane. In terms of magnitude, the absolute temperature of the membrane should be controlled to better than 0.01° C. and the temperature uniformity across the membrane should be better than 0.001° C. Deviations in the absolute temperature of the membrane carrying the liquid crystal will result in complete lack of operation, since the liquid crystal will not be at a temperature where the desired effect takes place. If a temperature non-uniformity exists across the membrane surface, a distorted rendition of the infrared image will occur. The aforesaid temperature non-uniformities are caused by the fact that the membrane must be supported in space, or mounted to an external support providing a direct radiation exchange between the membrane and its support. Additionally, each section of the membrane is radiation coupled to its surroundings.

Supporting the membrane implies a loss or gain of heat to the support, depending on whether the support is hotter or colder than the average temperature of the membrane. Thus, a radial temperature gradient will be generated, and this gradient is on the order of 1.5 cm. per degree centigrade. As will be apparent, a small difference in the membrane and membrane support structure as far as temperature is concerned will reduce the usable membrane size to a negligible area.

Accordingly, it is an object of this invention to provide an improved thermal imaging system of the type described by successfully dealing with the aforesaid membrane temperature problems.

SUMMARY OF THE INVENTION

In carrying out this invention in one illustrative embodiment thereof, the membrane containing the liquid crystal detector is supported through ribs or spokes of the same material as the membrane, to provide an extremely high thermal impedance between the body of the membrane containing the liquid crystal material and its external support.

Gradients due to differential radiation coupling to the liquid crystal are eliminated by using a diffusing reflective cone in front of the membrane, which forces all points on the membrane to optically see the same solid angle of temperature controlled chamber and environment.

DESCRIPTION OF THE PREFERRED EMBODIMENT

Figures 1, 2:
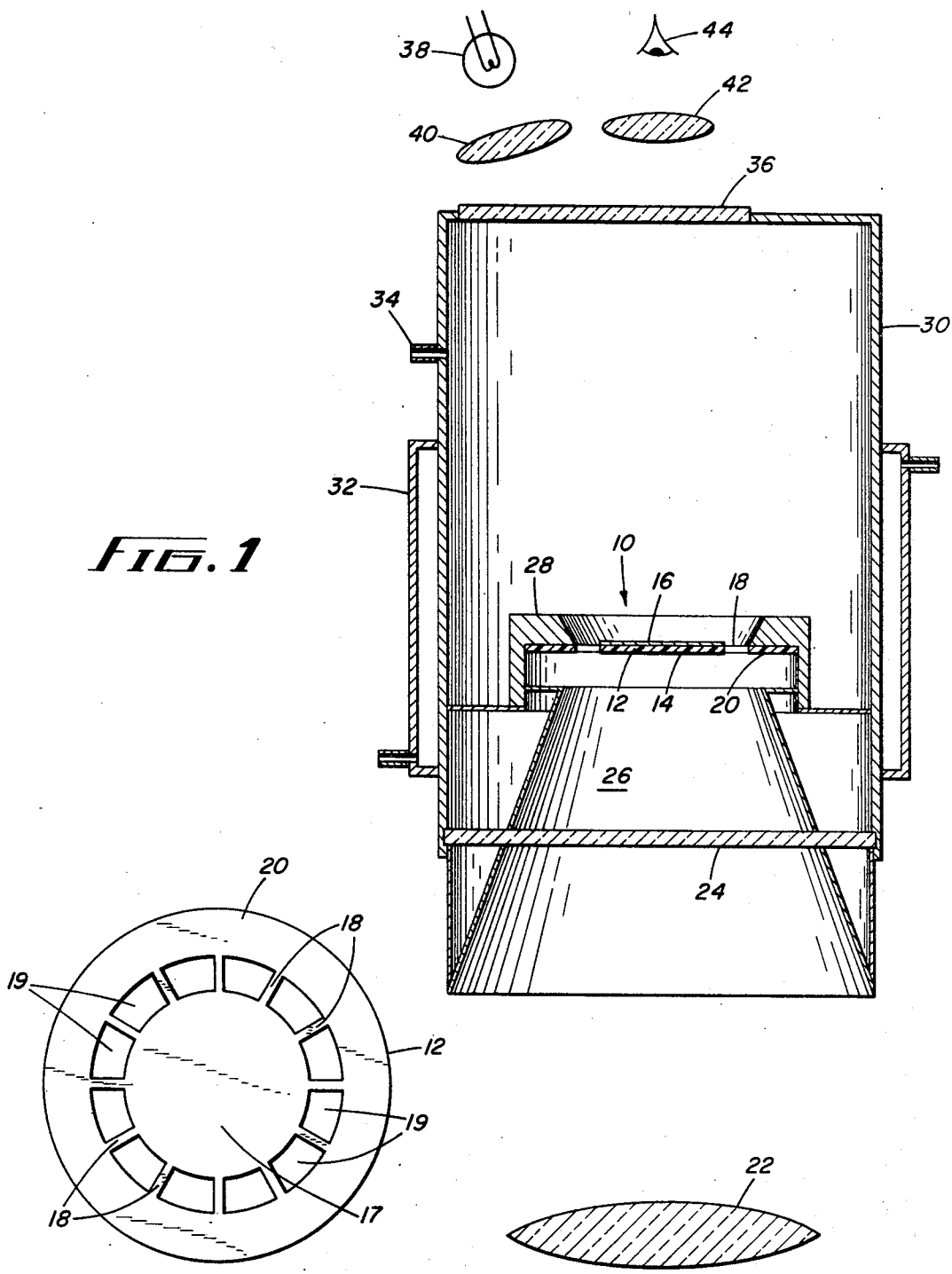
FIG. 1 is a schematic diagram, partly in section, of the thermal imaging system of the present invention.
FIG. 2 is an enlarged view of the membrane utilized in FIG. 1.

Referring now to FIG. 1, and evacuated housing 30 is provided having an evacuation tube 34 which may be connected to a vacuum pump (not shown). The temperature of the housing is controlled by a temperature control means 32 which is shown schematically and which performs the function of controlling the temperature of the evacuated housing 30. The enclosure has a first window 24 which is transparent to infrared radiation. At least a second window 36 on the opposite side of the housing 30 is provided which is transparent to visual radiation but reflects infrared radiation by the provision of a dichroic coating. It will be apparent that the window 36 may be in the form of a plurality of windows, if desired.

Mounted in the housing 30 is a liquid crystal detector referred to generally with the reference character 10. The liquid crystal detector is comprised of a very thin membrane 12 on the order of .00025" thick made of a suitable material such as polyethylene terephthalate, commercially sold as "Mylar," which is blackened on one side 14 and carries the liquid crystal material 16 on the other side thereof. The present invention is not directed to the type of liquid crystal material which may be employed, and the invention is not considered limited to such a material, and includes all commercially available type liquid crystals.

As will best be seen in FIG. 2, the membrane 12 has a central body portion 17 on which the liquid crystal is mounted. An annular outer extremity 20 is separated by the body portion 17 of the membrane 12 by ribs or spokes 18 which connect the body portion 17 to the rim 20. The spokes 18 of the membrane 12 are separated by open or cut-out areas 19. The membrane 12 may be constructed by cutting away the Mylar in areas 18 and leaving the spokes, or by melting away the undesired Mylar near its outer extremities.

Liquid crystal detector 10 is mounted on its outer periphery 20 to a support member 28 which is separated from the body of the membrane 12 by the spokes 18. The support 28 is mounted on a split diffusing reflective cone 26. On the opposite side of the chamber a source of illumination is applied via a collimating lens 40 through the window 36 onto the liquid crystal detector 10. The field of view of the imaging system is imaged by an obective lens 22 and the diffusing reflecting cone 26 onto the liquid crystal detector 10 through the first window 24. The visual image of the thermal image of the field of view thus applied is viewed by the eye 44 through a lens 42 through the second window 36. It will be apparent that separate windows may be utilized for the window 36, one for the source 38 and one for viewing by the eye 44.

The liquid crystal material 16 is deposited on the thin membrane 12 blackened at 14 to enhance the absorption of the thermal energy. The liquid crystal detector is mounted in an evacuated housing to eliminate thermal effects due to convection of the air. The two windows 24 and 36 in the evacuated housing 30 are provided to allow the infrared image from the field of view to be focused upon the detector and to permit the viewing of the visible image produced by the temperature sensitive material of the liquid crystal detector 10. The housing 30 is heated or cooled by the temperature controller 32 to bring the membrane 12 to the approximate temperature of operation which will depend on the operating characteristic of the liquid crystal material used for the liquid crystal detector 10.

As has been pointed out previously, in providing a thermal imaging system where the radiant energy to be measured is at approximately the same temperature as the environment, the temperature of the membrane on which the liquid crystal is mounted must be tightly controlled, for any irregularities or non-uniformities will impair the operation of the system. One of the problems is temperature non-uniformity across the membrane. This is caused by the fact that under usual conditions the percentage of the housing and the outside world seen by the elements in the center and the edge of the membrane will be different, causing a compilation of differential radiation which produces variations in membrane temperature. On the visual side such non-uniformities will render a distorted version of the thermal image applied to the liquid detector 10. This problem is treated in the present invention by optically forcing each element of the membrane 12 to see the same solid angle of temperature-controlled chamber and the outside world which is in the form of infrared energy, since the window 24 is transparent to infrared. Radiance due to differential radiation coupling can be eliminated. This optical technique is achieved by using a reflective cone 26 in front of the membrane 12. The cone 26 is so arranged that one side of the membrane sees over $2\pi$ steradians out of the chamber. This occurs either directly or after a reflection off of the cone. The other side of the membrane sees the inside of the thermal chamber 30. As an addition, the window 36 through which the membrane is viewed is coated with an interference filter which reflects the infrared but transmits the visible. Thus each element of the membrane 12 sees the same thermal radiation.

The other problem treated by the present invention deals with the problem of the absolute temperature of the membrane carrying the liquid crystal. This problem arises in supporting the liquid crystal detector 10 by some means. Since the support will normally have a much greater mass, the membrane will tend to assume the temperature of the support, thus greatly reducing the usable membrane area, since the support is massive thermally when contrasted to the membrane, This problem is treated, and greatly minimized, in the present invention by means of an extremely high thermal impedance between the body of the membrane 17 and the support 28. Materials to provide such a high thermal impedance would be difficult and would make the detector structure difficult if not impossible to manufacture in view of the thinness of the membrane. However, by using the membrane itself and reducing the area to the bare minimum by providing supporting ribs as needed to hold the membrane, the thermal gradient can be held to the ribbed area, thus providing a maximum usable uniform membrane area. Summarizing, the thermal gradient between the membrane and the support is primarily due to conduction from the membrane to the holder and to eliminate this conduction gradient, portions of the membrane are cut away from the periphery of the membrane, providing spoked connections to its outer extremity, raising the conduction impedance to a sufficiently high level that the thermal gradient between the center of the membrane and the walls of the housing or the support occur close to the rim of the membrane and not to the center. Since the temperature difference between the support 28 and the membrane 12 determines the useful membrane area, by supporting the membrane through the ribs or spokes 18, it is possible to use almost the entire body 17 of the membrane even though several degrees of temperature difference will exist between the membrane 12 and the support 28.

Since other modifications and changes varied to fit particular operating requirements will be apparent to those skilled in the art, this invention is not considered limited to the examples chosen for purposes of disclosure and covers all such changes which do not constitute departures from the true spirit and scope of this invention.

What is claimed is:
1. A thermal imaging system comprising
 (a) a temperature sensitive liquid crystal detector for detecting thermal energy and converting it to a visible thermal image having a liquid crystal material mounted on an extremely thin blackened membrane,
 (b) an evacuated housing having a first window transparent to infrared radiation and at least a second window transparent to visible radiation and opaque to infrared radiation,
 (c) said membrane having integral supporting ribs on its outer extremities with open areas therebetween to provide a high thermal impedance path between the body of the membrane on which the liquid crystal material is mounted and its outer extremities,
 (d) support means having said membrane mounted thereon with said ribs separating the body of the membrane and said supporting means,
 (e) means for applying thermal radiation from a field of view through said first window onto said liquid crystal detector, and
 (f) means for illuminating said liquid crystal detector through said second window whereby a visible image of said thermal radiation from said field of view may be viewed through said second window.
2. The thermal image system set forth in claim 1 wherein said means for applying thermal radiation from a field of view onto said liquid crystal detector includes a reflective cone positioned in front of said liquid crystal detector.

References Cited
UNITED STATES PATENTS 3,114,836  12/1963  Fergason et al. _____ 250—83
3,202,820  8/1965  Norton et al. _____ 250—83

ARCHIE R. BORCHELT, Primary Examiner

M. J. FROME, Assistant Examiner

U.S. Cl. X.R.
250—83.3